United States Patent [19]

Hasenauer

[11] 4,443,525

[45] Apr. 17, 1984

[54] HIGH-TEMPERATURE BATTERY

[75] Inventor: Dieter Hasenauer, Weinheim, Fed. Rep. of Germany

[73] Assignee: Brown, Boveri & CIE AG, Mannheim, Fed. Rep. of Germany

[21] Appl. No.: 375,968

[22] Filed: May 7, 1982

[30] Foreign Application Priority Data

May 12, 1981 [DE] Fed. Rep. of Germany ....... 3118692

[51] Int. Cl.³ .............................................. H01M 4/36
[52] U.S. Cl. .................................... 429/102; 429/112; 429/120; 429/178
[58] Field of Search ................. 429/120, 26, 101, 105, 429/104, 178, 179, 112, 102

[56] References Cited

U.S. PATENT DOCUMENTS

| | | | |
|---|---|---|---|
| 3,822,150 | 7/1974 | Beardshear et al. | 429/120 X |
| 3,915,741 | 10/1975 | Kogiso | 429/120 X |
| 4,126,734 | 11/1978 | Walters | 429/120 X |
| 4,235,956 | 11/1980 | Gross et al. | 429/120 X |
| 4,327,162 | 4/1982 | Borger | 429/120 |
| 4,332,866 | 6/1982 | Jacquelin | 429/120 X |

*Primary Examiner*—Charles F. LeFevour
*Attorney, Agent, or Firm*—Herbert L. Lerner; Laurence A. Greenberg

[57] ABSTRACT

High-temperature battery with at least one electrochemical storage cell of the alkali metal and chalcogen type and thermal insulation which surrounds the storage cell and is provided with feedthroughs for the electric conductors. Each of the electric conductors brought into the high-temperature battery consists of at least two subconductors which are connected to each other detachably and in an electrically conducting manner via at least one contact element. The contact element forming the contact point is arranged in the interior of the high-temperature battery.

6 Claims, 2 Drawing Figures

HIGH-TEMPERATURE BATTERY

BACKGROUND OF THE INVENTION

1. Field of the Invention

The invention relates to a high-temperature battery with at least one electrochemical storage cell of the alkali metal and chalcogen type, and thermal insulation which surrounds the storage cell and is provided with feedthroughs for electric conductors.

2. Description of the Prior Art

Such high-temperature batteries which are constructed from electrochemical cells will be used increasingly in the future for the electric propulsion of vehicles.

A high-temperature battery is constructed, for instance, of a multiplicity of electrochemical storage cells which are wired together in a particular manner. The high-temperature battery operates at a temperature between 350° C. and 500° C. In order to avoid heat losses, the storage cells of the high-temperature battery are surrounded by thermal insulation. To enable the high-temperature battery to resume its operation after an intermission of several hours or days, it must be kept during this time at a temperature of 300° C.

This, however, is very difficult in the high-temperature batteries known so far, since considerable heat is conducted to the outside during the intermission of the operation by the electrical connections. The electrical connections are brought through the insulation of the high-temperature battery. They represent the connection between the storage cells and the unit to be supplied with power.

SUMMARY OF THE INVENTION

It is therefore an object of the invention to provide a high-temperature battery which has a minimum of heat losses particularly during its operating pauses.

With the foregoing and other objects in view, there is provided in accordance with the invention a high-temperature battery comprising a housing of thermal insulation enclosing a cavity in the thermal insulation housing, at least one electrochemical storage cell based on alkali metal and chalcogen disposed in said cavity, at least one electric conductor passing through a feed trough in the thermal insulation for connecting the electric conductor at its end to the electrochemical storage cell in the cavity, with the other end of the electric conductor extending outside the high temperature battery, said electric conductor composed of at least two subconductors detachably connected to each other, said first subconductor disposed in the high-temperature battery and connected to the storage cell in an electrically conducting manner, said second subconductor passing from outside the high-temperature battery through said feedthrough in the thermal insulation in detachable engagement with the first subconductor, and at least one contact element in the cavity for forming a contact in an electrically conducting manner between the first and second subconductors.

Other features which are considered as characteristic for the invention are set forth in the appended claims.

Although the invention is illustrated and described herein as embodied in a high-temperature battery, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

In a high-temperature battery of the type mentioned at the outset, each electric conductor brought into the high-temperature battery consists of at least two subconductors which are connected to each other detachably and in an electrically conducting manner via at least one contact element. The contact element forming the contact point is arranged in the interior of the high-temperature battery.

Advantageously, both subconductors which form the electric conductor are made of a copper alloy which has high electric conductivity at high temperatures. Both subconductors have the shape of a rod. The first subconductor is arranged entirely within the battery and is connected in an electrically conducting manner to the storage cell. At its contact point, the first subconductor has a cylindrical hole which is concentric with its longitudinal axis. A contact element is inserted into the bore hole of the first subconductor.

During the operation of the high-temperature battery, the second subconductor is pushed through a canal in the thermal insulation of the high-temperature battery and snapped into the contact element which sits in the bore hole of the first subconductor. The diameter of the second subconductor is matched for this purpose to the diameter of the bore hole, particularly to the diameter of the contact element. Advantageously, the second subconductor can be detached from the contact element at any time and removed from the high-temperature battery, at least to the outer boundary surface of the thermal insulation.

In order to obtain a low heat loss during the operation of the high-temperature battery, the diameter of the canal is chosen just large enough for the second subconductor to be pushed through it.

As mentioned above, the second subconductor can be removed from the high-temperature battery, if required. The two subconductors are detached from each other preferably during the operating pauses of the high-temperature battery. As a result, the canal provided for bringing the second subconductor through the thermal insulation is filled only with air during this time. Consequently, the highly heat-conducting copper material of the second subconductor is no longer in connection with the hot interior of the high-temperature battery. The air standing in the canal of the thermal insulation acts as a good thermal insulation. The thermal conductivity of the air is 0.026 W/(mK). The thermal conductivity of the air is thus many times smaller than the thermal conductivity of the second subconductor. The latter is made as already mentioned above, of a copper alloy and has a thermal conductivity of $\lambda=384$ W/(m/K).

The invention will be explained in the following with particular reference to the drawings.

Figure 1:
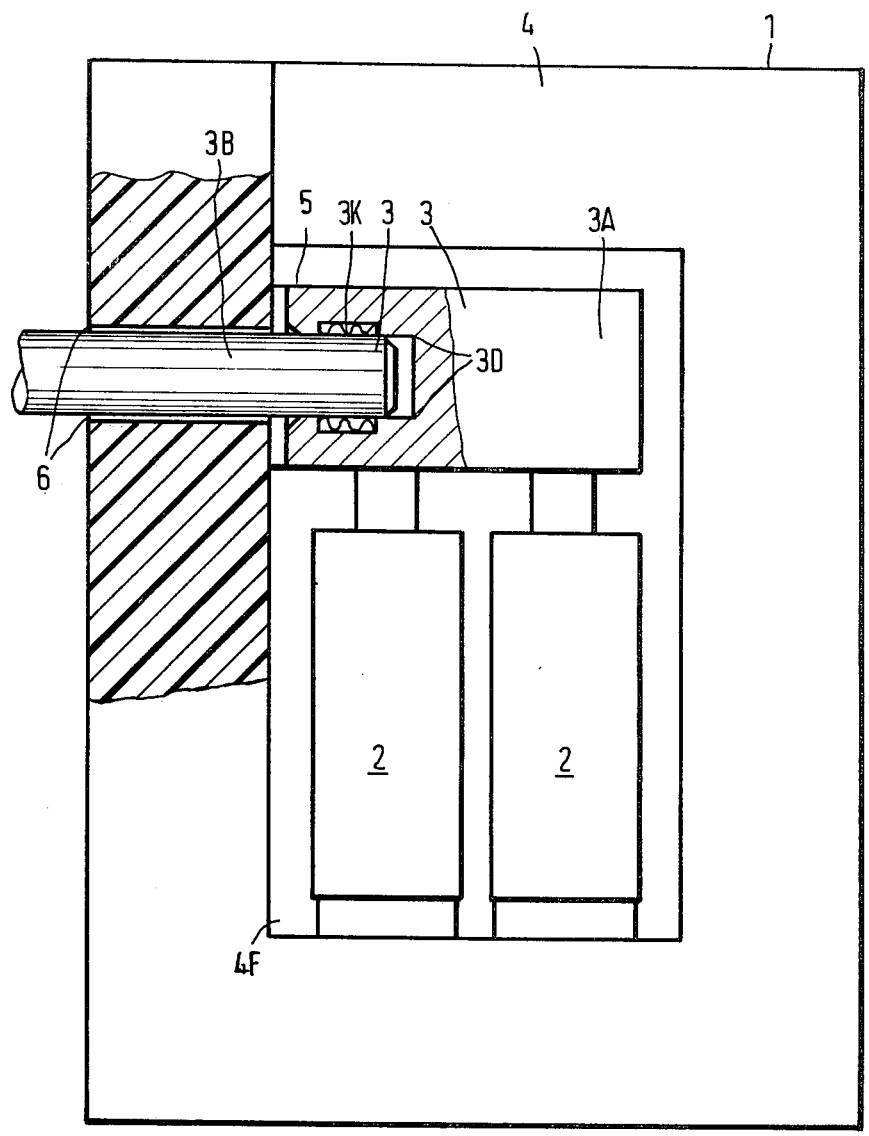
FIG. 1 diagrammatically illustrates a high-temperature battery in partial vertical section showing a surrounding housing of thermal insulation, a central cavity in the housing, two electrochemical storage cells in the cavity, an electric conductor connected to the cells and leading through the insulation to the outside of the battery, the conductor composed of a first subconductor connected to the cells and having a cylindrical hole with a contact element inserted in the hole, a second subconductor passing through a canal in the insulation and then into the hole in contact with the contact element thereby detachably engaging the first subconductor.

The high-temperature battery 1 shown in FIG. 1 comprises substantially two electrochemical storage cells 2, an electric conductor 3 as well as thermal insulation 4.

The number of storage cells of a high-temperature battery can be chosen at will; it depends preferably on the desired size of the high-temperature battery. The storage cells 2 shown here schematically both have an anode and a cathode space, which spaces are separated by an alkali ion-conducting solid electrolyte (not shown). The anode space of the storage cells 2 contains preferably liquid sodium, while the cathode space is filled with sulfur. Each storage cell is enclosed by a metallic housing which preferably also serves as the current collector. A second current collector projects into the solid electrolyte and extends several mm beyond the storage cell 2. The storage cells 2 are arranged inside the thermal insulation 4, which is designed in the form of a closed double-walled housing, and has in the interior an empty space 4F for receiving the storage cells 2.

The thermal insulation is preferably a vacuum insulation. It comprises an evacuated cavity within which insulating material is arranged. The cavity is disposed between the two boundary walls of the thermal insulation which are arranged at a defined distance from each other.

The storage cells arranged within the thermal insulation 4 are connected in an electrically conducting manner to one or several units (not shown) which are to be supplied with electric power. The units are located outside the high-temperature battery. This electrical connection is accomplished via the electric conductor 3, which is divided in the embodiment shown here into two subconductors 3A and 3B. Both subconductors are rod-shaped and are, preferably, made of copper alloy. They have a thermal conductivity $\lambda=384$ W/(mK). The two subconductors 3A and 3B can be connected to each other detachably and in an electrically conducting manner via a contact point 5 which is disposed inside the high-temperature battery 1. The first subconductor 3A is arranged entirely inside the high-temperature battery 1 and is connected to the storage cells 2 in an electrically conducting manner. The first subconductor 3A is provided with a cylindrical hole 30 in the region of the contact point 5, which is located preferably directly behind the inner boundary surface of the thermal insulation 4. The hole 30 is concentric with the longitudinal axis of subconductor 3A. A contact element 3K is inserted into hole 3D. The contact element is preferably designed as a multi-contact element.

The second subconductor 3B provides the connection between the outside of the high-temperature battery 1 and its inner region. The thermal insulation 4 is provided with a canal 6 via which the interior 4F is in communication with the outside of the high-temperature battery 1. The subconductor 3B can be brought through the canal 6 into the interior 4F. To avoid large heat losses, the diameter of this canal 6 is preferably chosen only slightly larger than the diameter of the subconductor 3B. The first subconductor 3A with its hole 3D is placed at the opening of the canal 6 located in the interior of the high-temperature battery 1. The diameter of the second subconductor 3B is chosen so that it can be inserted into the hole 3D or into the contact element 3K which is inserted into the hole 3D. The electrical conducting connection between the first subconductor 3A and the second subconductor 3B is established via the contact element 3K.

For the chemical reactions within the storage cells 2 to proceed, a temperature of about 350° C. is necessary. In order that this temperature can be kept continuously, the storage cells 2 are enclosed by the thermal insulation 4. By this measure, the conditions required for continuous battery operation are met even if heat is conducted to the outside continuously via the electric conductor 3.

Figure 2:
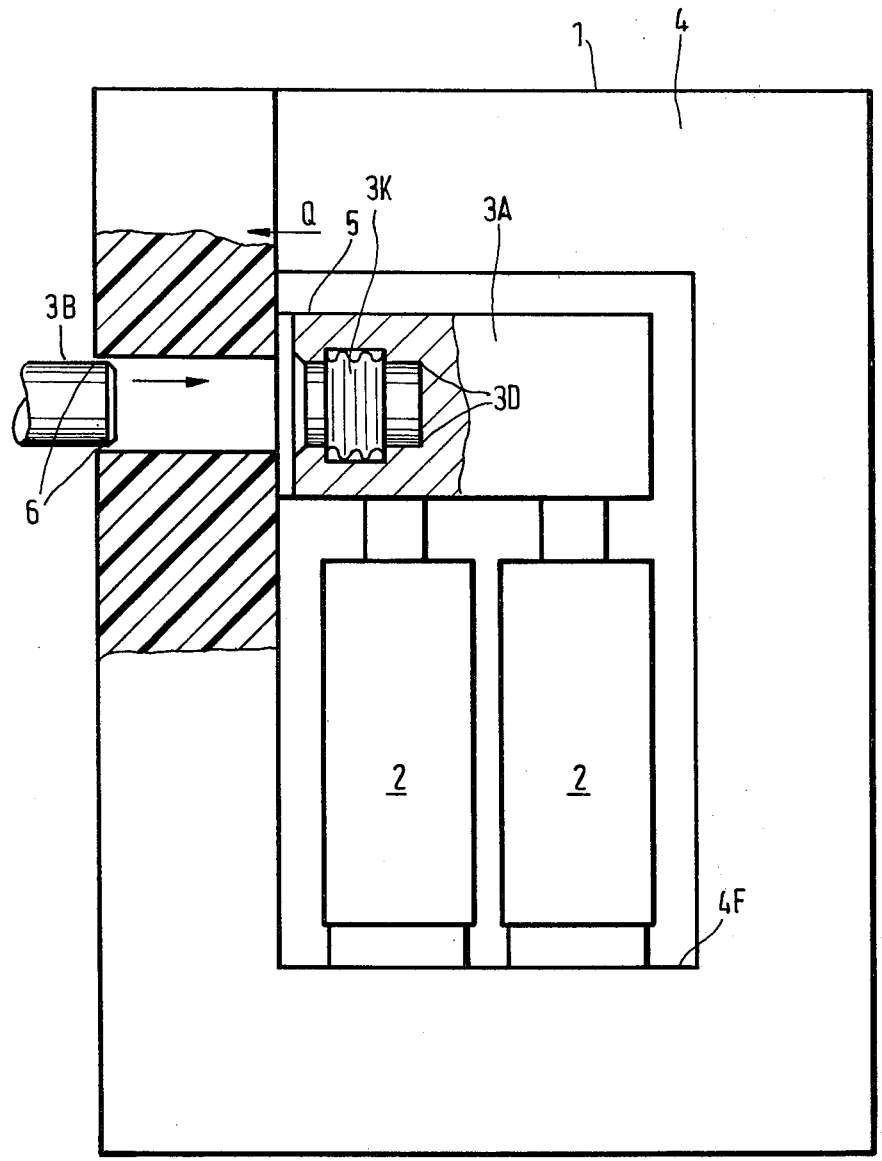
FIG. 2 shows the battery of FIG. 1 in the rest condition wherein the second subconductor is disengaged from the first subconductor.

If the high-temperature battery 1 is put out of operation for hours or days, the storage cells 2 must not cool down during this time but must be kept at a temperature elvel of 300° C. so that the high-temperature battery is operable again after the end of the pause. As already mentioned above, a very large amount of heat is transported from the interior of the high-temperature battery to the outside via the electric conductors 3. In order to eliminate this heat transport during the operating pause, the two subconductors 3A and 3B are separated from each other before the operating pauses begin. For this purpose, the second subconductor 3B is detached from the contact element 3K and is pulled out of the high-temperature battery 1 up to the outer boundary of the thermal insulation 4. This is possible in a simple manner because the two subconductors 3A and 3B are connected to each other detachably. This is shown in FIG. 2. FIG. 2, likewise, shows the high-temperature battery shown in FIG. 1 but in the rest condition. It can be seen from the drawing that the canal 6 is now filled only with air. As is well known, air had a very low thermal conductivity, the value of which is =0.026 W/(mK). Through this disposition of the second subconductor end 3B in front of the outer opening of the canal 5, no air circulation through the canal 6 is assured. Thereby the heat contained within the high-temperature battery, especially within the empty space 4F of the thermal insulation, is lost only gradually. In this embodiment of the battery, the required rest temperature of 300° C. can be maintained for several days.

I claim:

1. High-temperature battery comprising a housing of thermal insulation enclosing a cavity in the thermal insulation housing, at least one electrochemical storage cell of alkali metal and chalcogen electrodes disposed in said cavity, with at least one electric conductor passing through a feedthrough in the thermal insulation with one first end of the electric conductor connected to the electrochemical storage cell in the cavity, and with the other second end of said electric conductor extending outside the high-temperature battery, said electric conductor composed of at least two subconductors detachably connected to each other, said first subconductor with said first end of the conductor connected to the storage cell in an electrically conducting manner disposed in the high temperature battery, said feedthrough formed as a canal in the thermal insulation and said second subconductor pushed through the canal and snapped into a contact element sitting in a hole of the first subconductor, wherein the second subconductor is removable from the contact element of the first subconductor to an extent of at least to the outer boundary surface of the thermal insulation permitting the canal in the insulation vacated by removal of the second subconductor to be filled with air, which air is a poor conductor of heat and retards heat loss during pauses in the operation of the high-temperature battery.

2. High-temperature battery according to claim 1, wherein the first subconductor is made of a copper alloy.

3. High-temperature battery according to claim 1, wherein the second subconductor is made of a copper alloy.

4. High-temperature battery according to claim 1, wherein the second subconductors are rod-shaped.

5. High-temperature battery according to claim 1, wherein the contact element is a multi-contact element.

6. High-temperature battery according to claim 1, wherein the diameter of the canal for bringing through the second subconductor is slightly larger than the diameter of the second subconductor.

* * * * *